US009226236B2

(12) United States Patent
Lee et al.

(10) Patent No.: US 9,226,236 B2
(45) Date of Patent: *Dec. 29, 2015

(54) LOW DUTY CYCLE DEVICE PROTOCOL (71) Applicant: QUALCOMM INCORPORATED, San Diego, CA (US)

(72) Inventors: Chong U. Lee, Cupertino, CA (US); Babak Aryan, San Diego, CA (US); Alejandro R. Holcman, San Diego, CA (US); Kirk Allan Burroughs, Alamo, CA (US); Ron Keidar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/169,824

(22) Filed: Jan. 31, 2014

(65) Prior Publication Data

US 2014/0148159 A1 May 29, 2014

Related U.S. Application Data (60) Division of application No. 12/020,389, filed on Jan. 25, 2008, now Pat. No. 8,700,105, and a continuation-in-part of application No. 11/766,068, filed on Jun. 20, 2007, now Pat. No. 8,018,884.

(Continued)

(51) Int. Cl.
*H04M 1/00* (2006.01)
*H04B 1/16* (2006.01)
*H04M 3/42* (2006.01)

(Continued)

(52) U.S. Cl.
CPC ............ *H04W 52/0216* (2013.01); *H04W 4/14* (2013.01); *H04W 52/0235* (2013.01); *H04W 52/0248* (2013.01); *H04W 72/12* (2013.01); *H04W 88/02* (2013.01)

(58) Field of Classification Search
CPC .. Y02B 60/50; H04W 92/02; H04W 52/0216; H04W 72/12
USPC ......... 455/574, 343.2, 343.5, 414.1, 458, 466
See application file for complete search history.

(56) References Cited

U.S. PATENT DOCUMENTS 5,276,703 A 1/1994 Budin et al.
5,748,103 A 5/1998 Flach et al.
(Continued)

FOREIGN PATENT DOCUMENTS

CA 2433110 C 6/2004
CN 1323495 A 11/2001
(Continued)

OTHER PUBLICATIONS

International Search Report—PCT/US08/052224, International Search Authority—European Patent Office—Jun. 11, 2008.
(Continued)

*Primary Examiner* — Dung Hong
(74) *Attorney, Agent, or Firm* — Mahmoud Munes Tomeh (57) ABSTRACT The subject matter disclosed herein relates to a system and method for establishing communication between a low duty cycle device and other devices through a wireless communication network. In one particular implementation, the low duty cycle device may awaken from a hibernating state in synchronization with transmission of messages.

26 Claims, 6 Drawing Sheets

Related U.S. Application Data (60) Provisional application No. 60/886,904, filed on Jan. 26, 2007, provisional application No. 60/887,536, filed on Jan. 31, 2007, provisional application No. 60/815,679, filed on Jun. 21, 2006.

(51) Int. Cl.

| | | |
|---|---|---|
| H04W 68/00 | (2009.01) | |
| H04W 4/00 | (2009.01) | |
| G08C 17/00 | (2006.01) | |
| H04W 52/02 | (2009.01) | |
| H04W 4/14 | (2009.01) | |
| H04W 72/12 | (2009.01) | |
| H04W 88/02 | (2009.01) | |

(56) References Cited

U.S. PATENT DOCUMENTS

| | | |
|---|---|---|
| 5,748,104 A | 5/1998 | Argyroudis et al. |
| 5,797,094 A | 8/1998 | Houde et al. |
| 6,154,500 A | 11/2000 | Dorenbosch et al. |
| 6,397,053 B1 | 5/2002 | Ghiazza |
| 6,449,491 B1 | 9/2002 | Dailey |
| 6,463,307 B1 | 10/2002 | Larsson et al. |
| 6,480,476 B1 | 11/2002 | Willars |
| 6,490,446 B1 | 12/2002 | Haartsen |
| 6,687,501 B2 | 2/2004 | Soliman |
| 7,027,425 B1 | 4/2006 | Fullerton et al. |
| 7,027,796 B1 | 4/2006 | Linsky et al. |
| 7,047,051 B2 | 5/2006 | Sackett et al. |
| 7,301,477 B2 | 11/2007 | Isoyama et al. |
| 7,319,867 B2 | 1/2008 | Li |
| 7,386,299 B2 | 6/2008 | Nakamura |
| 7,394,782 B2 | 7/2008 | Davis |
| 7,412,265 B2 | 8/2008 | Chen et al. |
| 7,457,973 B2 | 11/2008 | Liu |
| 7,466,665 B2 | 12/2008 | Calcev et al. |
| 7,508,781 B2 | 3/2009 | Liu et al. |
| 7,558,605 B2 | 7/2009 | Lee et al. |
| 7,565,181 B1 | 7/2009 | Hans et al. |
| 7,747,258 B2 | 6/2010 | Farmer |
| 7,945,234 B2 | 5/2011 | Lee et al. |
| 8,018,884 B2 | 9/2011 | Lee et al. |
| 8,443,083 B2 | 5/2013 | Khushu et al. |
| 8,509,859 B2 | 8/2013 | Jarosinski et al. |
| 8,605,630 B2 | 12/2013 | Lee et al. |
| 8,700,105 B2 | 4/2014 | Lee et al. |
| 2001/0027378 A1* | 10/2001 | Tennison et al. ............... 701/213 |
| 2002/0016190 A1 | 2/2002 | Higuchi et al. |
| 2002/0058528 A1* | 5/2002 | Hunzinger .................... 455/550 |
| 2003/0109268 A1* | 6/2003 | Fraser et al. .................. 455/466 |
| 2003/0148800 A1 | 8/2003 | Lee |
| 2003/0227382 A1 | 12/2003 | Breed |
| 2004/0024879 A1 | 2/2004 | Dingman et al. |
| 2004/0174270 A1 | 9/2004 | Choi |
| 2004/0198255 A1 | 10/2004 | Hayashida |
| 2004/0218556 A1 | 11/2004 | Son et al. |
| 2004/0225892 A1 | 11/2004 | Bear et al. |
| 2005/0054389 A1* | 3/2005 | Lee et al. ..................... 455/574 |
| 2005/0055418 A1 | 3/2005 | Blanc et al. |
| 2005/0060089 A1 | 3/2005 | Garin et al. |
| 2005/0108589 A1 | 5/2005 | Kadatch et al. |
| 2005/0129009 A1 | 6/2005 | Kitchin |
| 2005/0190723 A1 | 9/2005 | Rao et al. |
| 2005/0197125 A1* | 9/2005 | Kang et al. ................... 455/439 |
| 2006/0025181 A1 | 2/2006 | Kalofonos et al. |
| 2006/0068750 A1 | 3/2006 | Burr |
| 2006/0111825 A1 | 5/2006 | Okada et al. |
| 2006/0120303 A1 | 6/2006 | Yarvis et al. |
| 2006/0120314 A1 | 6/2006 | Krantz et al. |
| 2006/0223454 A1 | 10/2006 | Westwick et al. |
| 2006/0238417 A1 | 10/2006 | Jendbro et al. |
| 2006/0280140 A9 | 12/2006 | Mahany et al. |
| 2007/0008916 A1 | 1/2007 | Haugli et al. |
| 2007/0053315 A1 | 3/2007 | Sugaya |
| 2007/0057767 A1 | 3/2007 | Sun et al. |
| 2007/0116033 A1 | 5/2007 | Reunamaki et al. |
| 2007/0127425 A1 | 6/2007 | Keidar et al. |
| 2007/0127435 A1 | 6/2007 | Antony et al. |
| 2007/0132751 A1 | 6/2007 | Claessen et al. |
| 2007/0150599 A1 | 6/2007 | Neogi et al. |
| 2007/0153876 A1 | 7/2007 | Pi et al. |
| 2007/0248057 A1 | 10/2007 | Keidar et al. |
| 2007/0274244 A1* | 11/2007 | Yoon et al. .................... 370/311 |
| 2007/0291673 A1* | 12/2007 | Demirhan et al. ............ 370/311 |
| 2008/0049700 A1 | 2/2008 | Shah et al. |
| 2008/0242313 A1 | 10/2008 | Lee et al. |
| 2009/0129325 A1 | 5/2009 | Prakash et al. |
| 2010/0015916 A1 | 1/2010 | Holcman et al. |
| 2012/0257563 A1 | 10/2012 | Sinnarajah et al. |
| 2014/0071859 A1 | 3/2014 | Lee et al. |

FOREIGN PATENT DOCUMENTS

| | | |
|---|---|---|
| CN | 1464753 A | 12/2003 |
| CN | 1592292 A | 3/2005 |
| CN | 1740949 A | 3/2006 |
| CN | 1930793 A | 3/2007 |
| CN | 1933672 A | 3/2007 |
| CN | 101194232 A | 6/2008 |
| EP | 1158685 B1 | 10/2002 |
| JP | 1286528 | 11/1989 |
| JP | H1063979 A | 3/1998 |
| JP | 10094053 A | 4/1998 |
| JP | 10191424 | 7/1998 |
| JP | 10290193 A | 10/1998 |
| JP | 1175261 | 3/1999 |
| JP | 11313370 | 11/1999 |
| JP | 2000078305 A | 3/2000 |
| JP | 2001357483 A | 12/2001 |
| JP | 2002544635 A | 12/2002 |
| JP | 2003516681 A | 5/2003 |
| JP | 2003244164 A | 8/2003 |
| JP | 2004040812 A | 2/2004 |
| JP | 2004185459 A | 7/2004 |
| JP | 2005135289 A | 5/2005 |
| JP | 2005328230 A | 11/2005 |
| JP | 2005535901 T | 11/2005 |
| JP | 2006513644 A | 4/2006 |
| JP | 2006174328 A | 6/2006 |
| JP | 2006254317 A | 9/2006 |
| JP | 2006270296 A | 10/2006 |
| JP | 2007067829 A | 3/2007 |
| JP | 2007507150 A | 3/2007 |
| RU | 2181229 C1 | 4/2002 |
| TW | 235564 B | 7/2005 |
| WO | WO-9619084 A1 | 6/1996 |
| WO | WO-9718639 | 5/1997 |
| WO | WO-9927465 A1 | 6/1999 |
| WO | WO-0010353 A1 | 2/2000 |
| WO | WO-0070572 A1 | 11/2000 |
| WO | WO-0128274 A1 | 4/2001 |
| WO | WO-0231989 | 4/2002 |
| WO | WO-02080483 A1 | 10/2002 |
| WO | WO-2004017092 A1 | 2/2004 |
| WO | WO-2004066564 A1 | 8/2004 |
| WO | WO-2005032176 A1 | 4/2005 |
| WO | WO-2005096516 A1 | 10/2005 |
| WO | WO-2005109842 A2 | 11/2005 |
| WO | WO-2006084287 A1 | 8/2006 |
| WO | WO-2006099535 A1 | 9/2006 |
| WO | WO-2006115577 A1 | 11/2006 |
| WO | WO-2006119471 A2 | 11/2006 |
| WO | WO-2007149993 A2 | 12/2007 |

OTHER PUBLICATIONS

Panchabhai A M et al., "A Node Hibernation Protocol utilizing multiple transmit power levels for wireless sensor networks", Vehicular Technology Conference, 2004. VTC2004-Fall. 2004 IEEE 60th, IEEE, Sep. 29, 2004, vol. 4, pp. 2808-2813.

(56) References Cited

OTHER PUBLICATIONS

Ramanathan N et al., "A Stream-Oriented Power Management Protocol for Low Duty Cycle Sensor Network Applications", Embedded Networked Sensors, 2005. EmNetS-II. The Second IEEE Workshop on,IEEE,May 31, 2005,p. 53-62.
Written Opinion—PCT/US08/052224, International Search Authority—European Patent Office—Jun. 11, 2008.

* cited by examiner

LOW DUTY CYCLE DEVICE PROTOCOL

CLAIM OF PRIORITY AND CROSS REFERENCE TO RELATED APPLICATIONS

The present application for patent is a divisional and claims priority from Utility patent application Ser. No. 12/020,389, filed Jan. 25, 2008, entitled Low duty cycle device protocol, and is assigned to the assignee hereof and hereby expressly incorporated by reference herein. This application claims the benefit of priority under 35 USC §119 (e) of U.S. Provisional Patent Application Nos. 60/887,536, filed on Jan. 31, 2007; and 60/886,904, filed on Jan. 26, 2007, which are hereby incorporated herein by reference, and is a continuation in part and claims benefit of priority of U.S. patent application Ser. No. 11/766,068, filed on Jun. 20, 2007, which claims priority to U.S. Provisional Patent application No. 60/815,679, filed on Jun. 21, 2006 and which is hereby incorporated herein by reference.

BACKGROUND

1. Field

The subject matter disclosed herein relates to communication systems and networks including low duty cycle devices.

2. Information

Remote monitoring of operations may include the use of low power and/or battery-operated, wireless telecommunication devices that monitor operational status information and transmit operational status information to a remotely situated information-processing device. Here, for example, such operational status may be transmitted via radio frequency signals as short messages. A telecommunication device employing a power consumption saving technique may not be able to communicate with a remotely situated information-processing device if the telecommunication device is in a sleep mode in order to conserve battery power.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a first device is adapted to awaken in periods from a hibernating state to enable communication with a wireless communication network. By synchronizing with such periods, a second device may schedule transmission of information in the wireless communication network to the first device during such periods. It should be understood, however, that this is merely one example implementation and that claimed subject matter is not limited to this particular implementation.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may comprise, for example, a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards, for example. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an example, a device and/or system may estimate its location based, at least in part, on signals received from SVs. In particular, such a device and/or system may obtain "pseudorange" measurements comprising approximations of distances between associated SVs and a navigation satellite receiver. In a particular example, such a pseudorange may be determined at a receiver that is capable of processing signals from one or more SVs as part of a Satellite Positioning System (SPS). To determine its location, a satellite navigation receiver may obtain pseudorange measurements to three or more satellites as well as their positions at time of transmitting.

Techniques described herein may be used with any one of several SPS'. Furthermore, such techniques may be used with positioning determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

In one particular implementation, a device may comprise a navigation receiver may be adapted to receive signals from one or more transmitters, which are indicative of a location of the navigation receiver. The device may further include a transceiver which is adapted to communicate with other devices such as, for example, a server through a wireless communication network. In one aspect, the device may be adapted to intermittently awaken from a hibernated or hibernating state in synchronization with the location server to exchange information with the location server over the wireless communication network. However, this is merely an example of a particular implementation and claimed subject matter is not limited in this respect.

While in a hibernating state, a device may operate at a reduced power and reduced functionality. In one particular example, a device in a hibernating state may not be capable of receiving and/or processing signals transmitted in a wireless communication network. In another implementation, a device in a hibernating state may sufficiently power a timing feature to track duration of hibernation cycles and/or the like and initiate an awakening of the device from a hibernating state. By intermittently awakening from a hibernated state in synchronization with a location server, a device may receive information in a downlink communication channel from a server through a bi-directional communication channel without constantly being in a full power state to receive signals from a wireless communication network.

Figure 1:
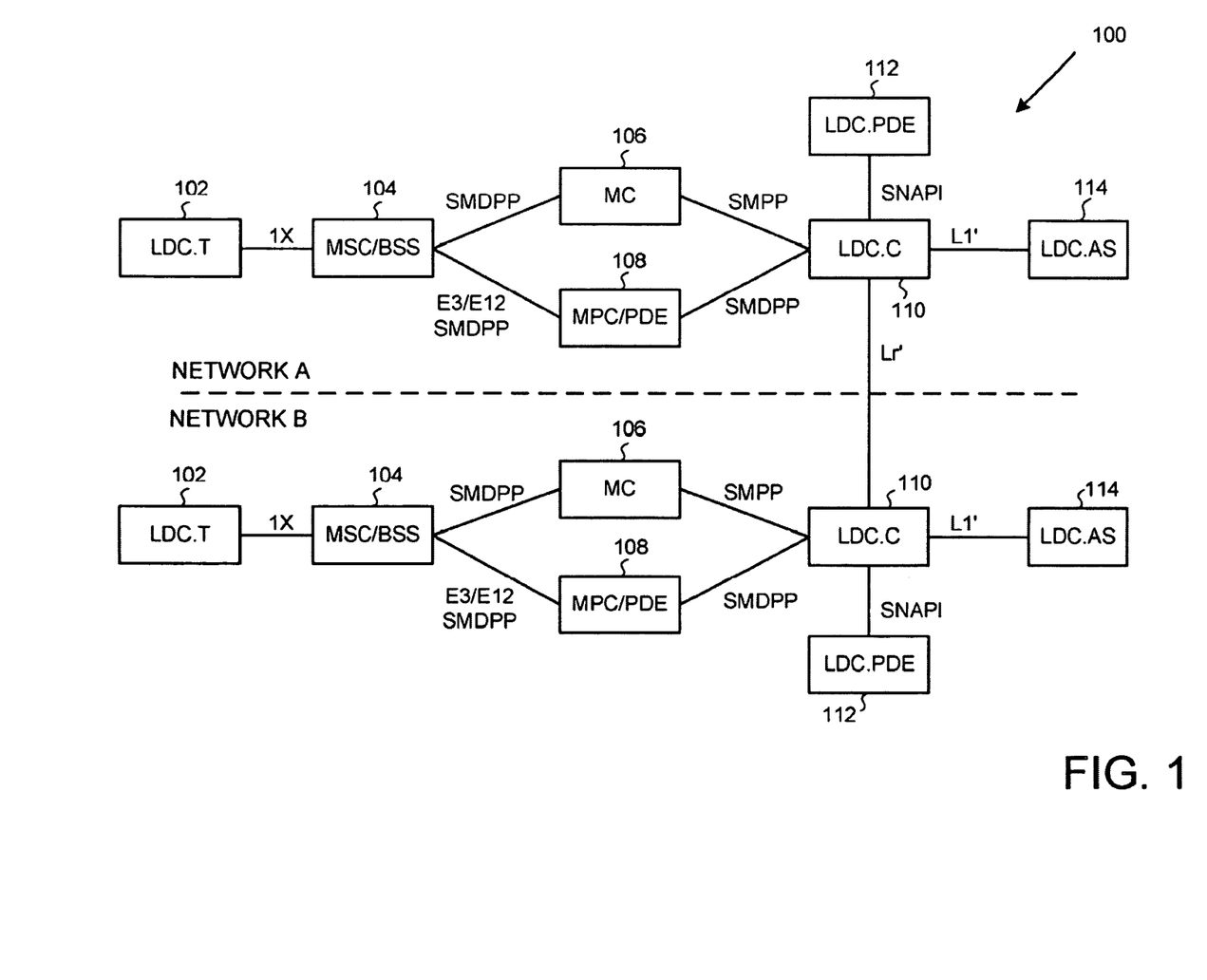
FIG. 1 is a schematic diagram of communication network adapted to communicate with one or more communication terminals according to one aspect.

FIG. 1 is a schematic diagram of communication network adapted to communicate with one or more communication terminals according to one aspect. Here terminals 102 may comprise any one of several devices adapted to obtain information relating to its location. Here, a terminal 102 may comprise any one of several low-power devices such as, for example, a device embedded in clothing, a pet collar, mobile telephone, key ring, a shipping container or a transportation vehicle, just to name a few examples. Here, such devices may comprise battery powered devices capable of operating in a power saving mode to preserve and/or extend battery life. Terminal 102 may be employed in any one of several applications including, for example, asset tracking, automated meter reading, cashless payment of parking meters, traffic lights and sensors, billboards and public displays, real-time health monitoring, home/office security and alarm systems, automotive telematics, utility distribution and grid monitoring, position/location monitoring and/or polling applications, just to name a few examples.

In one implementation, a terminal 102 may be configured to communicate with a center 110 and/or application server 114. Here, a center 110 may comprise any one of several devices and/or processes such as, for example, a communication server that is adapted to facilitate transmission of messages between devices in a first communication network and devices in a second communication network. In one aspect, a terminal 102 may transmit information to a center 110 and/or application server 114 through an uplink portion of a wireless communication link with an associated mobile switching center and/or base station subsystem (MSC/BSS) 104. In one particular implementation, such an uplink portion of a wireless communication link may comprise access channels used for transmission of registration requests, call set up requests, page responses, order responses, and/or other information that may be required by system protocols. Information transmitted to a center 110 and/or application server 114 in the uplink portion may include, for example, status information regarding one or more devices co-located with a terminal 102, sensor data, location information, battery status and/or the like. In this context, "location information" refers to information that may be descriptive of a location, such as an estimate of a location of a terminal 102, and/or information that may be used in computing such an estimate.

Also, a center 110 and/or application server 114 may transmit information to a terminal 102 through a downlink portion of the wireless communication link with the associated MSC/BSS 104. In one particular implementation, such a downlink portion of a wireless communication link may comprise pilot channels providing beacon functionality for initial system acquisition, sync channels for carrying system parameters required at system acquisition, and paging channels used to carry overhead messages, pages, setup messages and orders. Information transmitted to a terminal 102 in a downlink portion may include, for example, information to control one or more devices co-located with the terminal 102, commands to control and/or configure the terminal 102 and/or the like. As illustrated below, a terminal 102 may from time to time hibernate on intervals of a predetermined cycle. In particular implementations, such a commands to control and/or configure such a terminal 102 may comprise a command to change a hibernation interval of such a predetermined cycle.

Figure 2:
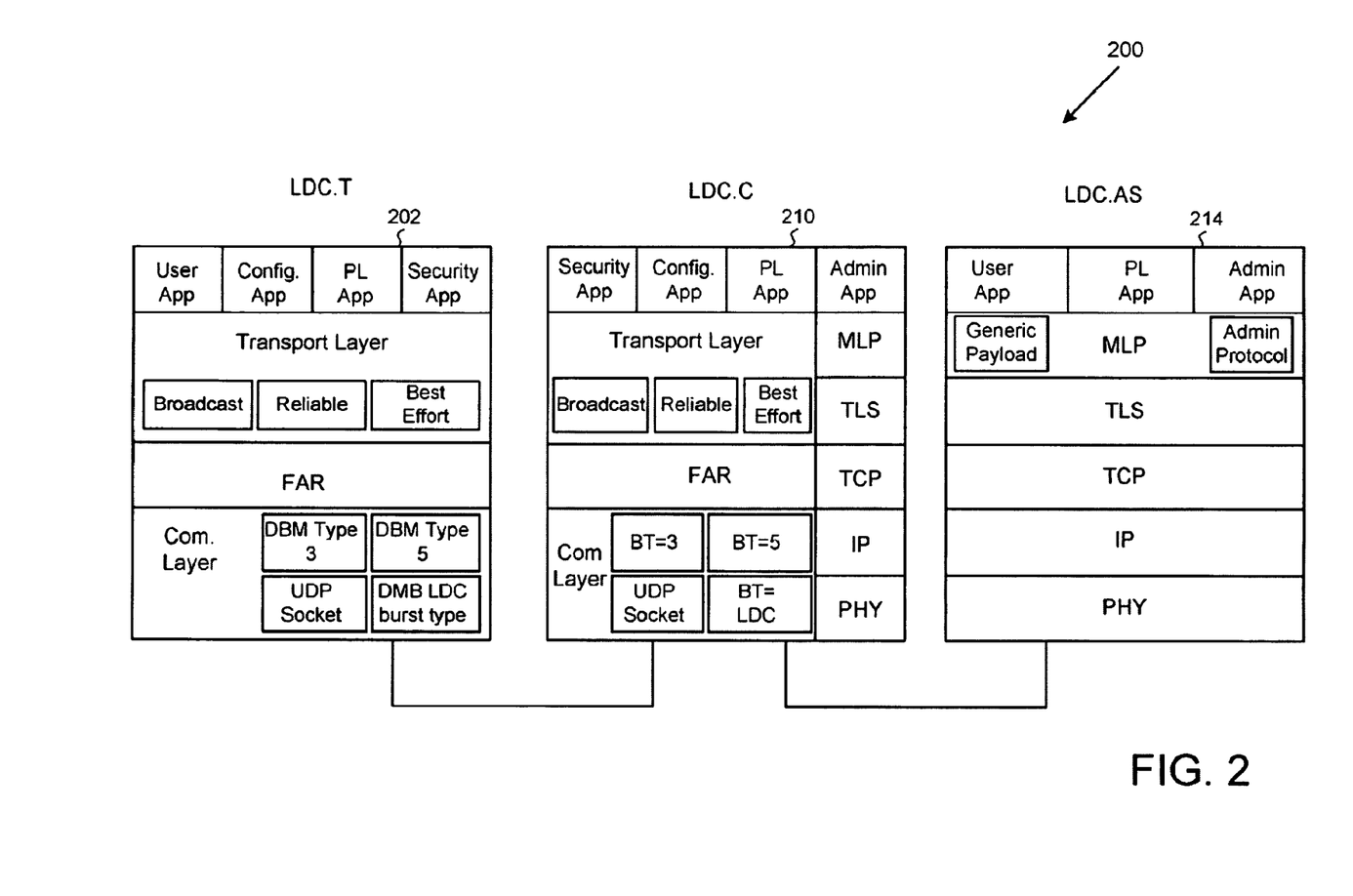
FIG. 2 is a schematic diagram illustrating communication protocol stacks according to one implementation.

In particular implementations, a center 110 may communicate with a terminal 102 according to a short message system (SMS) protocol. Here, for example, such transmission of messages between a center 110 and terminal 102 according to an SMS protocol may be facilitated by a message center (MC) 106 and/or mobile positioning center 108, for example. Information may be transmitted between a center 110 and associated application server 114 using any one of several communication protocols and network communication infrastructure such as, for example, TCP/IP over any Internet Protocol infrastructure. Here, an example implementation of protocol stacks for a terminal 102, center 110 and application server 114 may be as depicted in FIG. 2 as protocol stacks 202, 210 and 214, respectively. In at least one alternative implementation, to reduce latencies a center 110 may be adapted to communicate directly with an MSC/BSS 104 according to a short message delivery point-to-point bearer service (SMDPP). However, these are merely examples of how a terminal, center and/or application server may communicate with one another using particular implementations of protocol stacks and claimed subject matter is not limited in these respects.

In one aspect, a terminal 102 may comprise one or more devices capable of collecting information for use in computing an estimate of a location of the terminal 102 using any one of several techniques. In one implementation, radio frequency (RF) signals received at a receiver (not shown) associated with a terminal 102 may be used to compute an estimate of a location of the terminal 102 using techniques known to those of skill in the art. Such signals may include, for example, SPS signals. Here, such received SPS signals may be used to determine a pseudorange measurements that may be used to compute an estimate of a location, for example. In other implementations, such received signals may also include signals received from terrestrial transmitters such as, for example, transmitters on devices in a WLAN, WPAN and/or WWAN, for example. Characteristics from these signals such as signal strength, media access control (MAC) addresses, and/or the like may also be used to compute an estimate of a location.

In one example, although claimed subject matter is not limited in this respect, a device (not shown) associated with a terminal 102 may be capable of obtaining pseudorange measurements to transmitters based, at least in part, on SPS signal received at the device using known techniques. Here, such a device may be capable of receiving acquisition assistance information from another device such as a position determination entity PDE 112 and/or mobile positioning center/PDE (MPC/PDE) 108. In one particular implementation, such a device may further be capable of estimating its location based, at least in part, on such pseudorange measurements obtained from received SPS signals. Alternatively, the terminal 102 may forward such pseudorange measurements and/or other information derived from received signals through an uplink with an MSC/BSS 104 and to a destination such an estimate a location of the terminal 102 can be computed. For example, an application server 114 and/or PDE 112 may determine a location of a terminal 102 based, at least in part, on pseudorange measurements and/or other information received from the terminal 102. It should be understood, however, that this is merely on example of how a location of a device may be estimated according to a particular implementation and claimed subject matter is not limited in this respect.

Figure 3:
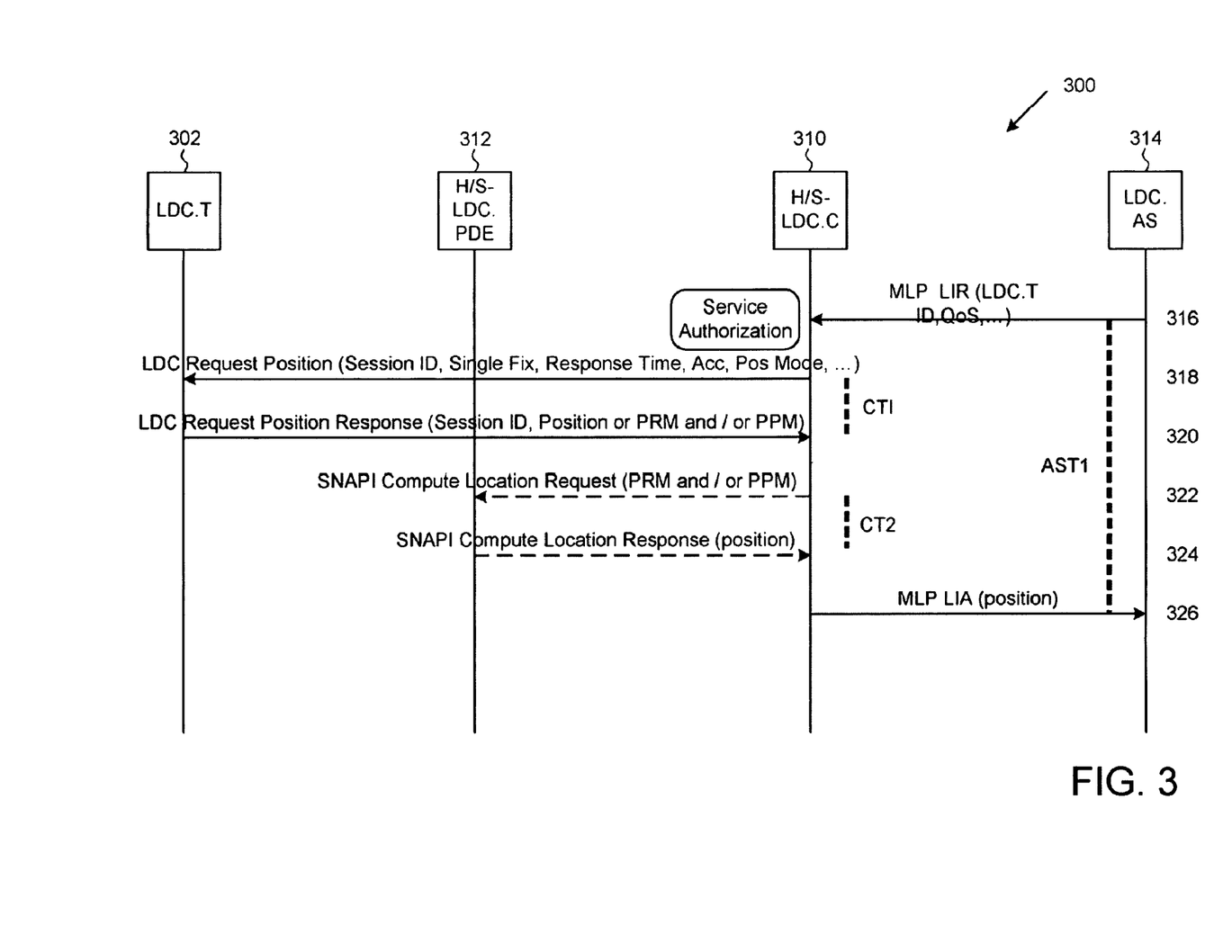
FIG. 3 is a diagram illustrating a call flow according to one aspect.

FIG. 3 is a diagram illustrating a call flow 300 for an immediate signal request for a terminal according to one aspect. Here, at an event 316 an application server 314 may initiate a location immediate request (LIR) message to terminal 302 including, for example, a unique identifier associated with terminal 302. In response to the LIR message, at event 318 center 310 may initiate position request message (PRM) in a call to terminal 302 requesting location information. In response to the PRM, at event 320 the terminal 302 may respond with a message containing information such as, for example, an estimate of the location of terminal 302 (e.g., as autonomously computed at terminal 302) and/or information that may be used in computing such an estimate (e.g., pseudorange measurements and/or other measurements based, at least in part on signals received at terminal 302).

At event 326, center 310 may return to application server 314 an estimate of the location of terminal 302 including, for example, information indicative of uncertainty associated with the estimate. In one alternative, upon receipt of a response message at event 320, center 310 may call PDE 312 at an event 322 to request computation of an estimate of the location of terminal 302. Here, such a call to PDE 312 may include, for example, information received at event 320 that may be used in provide information that may be used in estimating a location of terminal 302. Based, at least in part, on such information, PDE 312 may compute an estimate of the location of terminal 302 along with a measure of uncertainty of the estimate and transmit a message to center 310 containing same at event 324 in response to the call from center 310. In a particular implementation, although claimed subject matter is not limited in this respect, PDE 312 and center 310 may communicate according to any one of several communication protocols such as protocols implemented according to a SnapTrack™ application programming interface (SNAPI).

Figure 4:
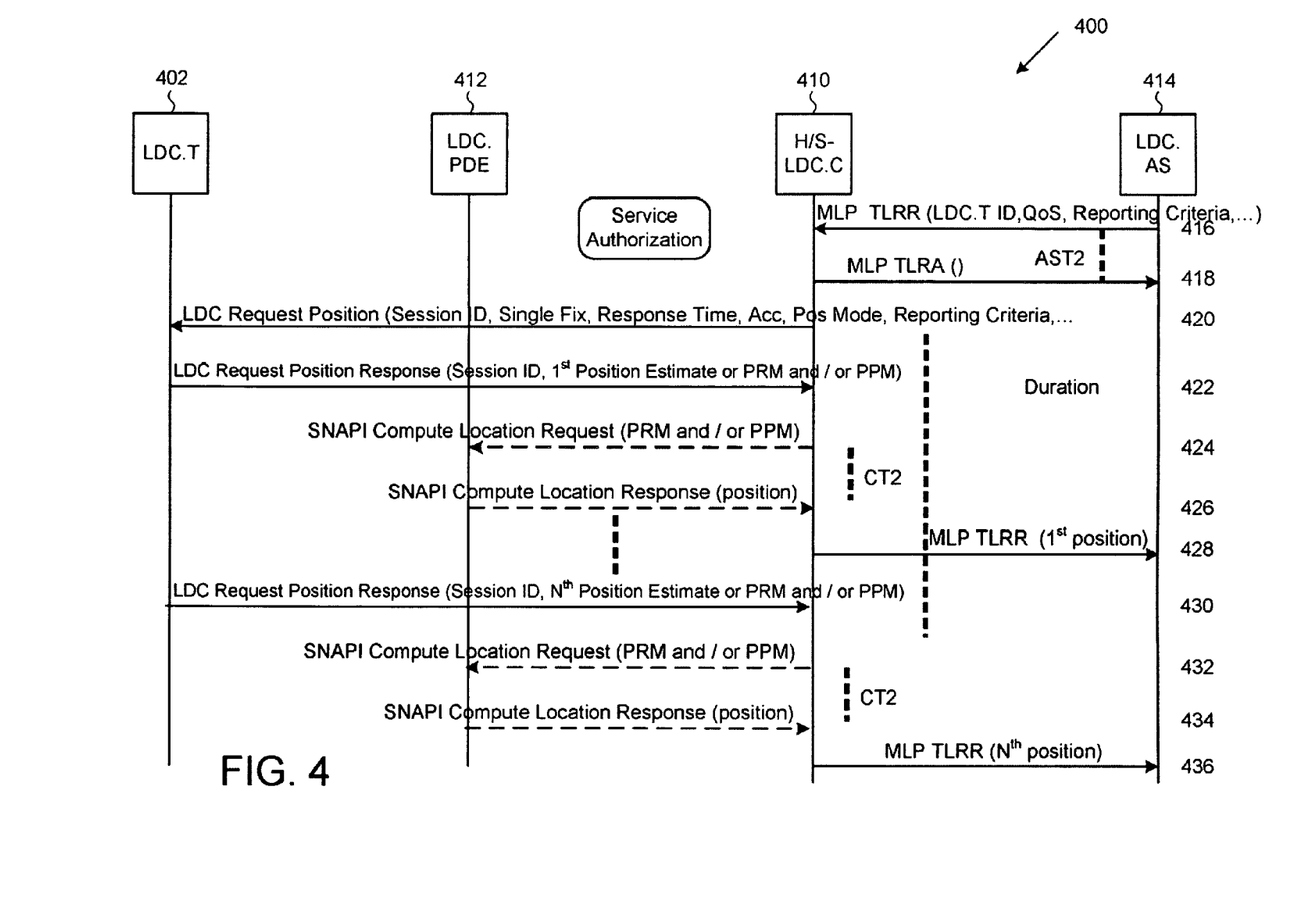
FIG. 4 is a diagram illustrating a call flow according to another aspect.

FIG. 4 is a diagram illustrating a call flow 400 for an immediate signal request for a terminal according to one aspect. Here, an application server 414 may transmit an MLP message at event 416 as detailed above with reference to FIG. 3. In this particular example, however, an MLP message transmitted at event 416 may also indicate "reporting criteria." In one example, such reporting criteria may include a command requesting that location information associated with terminal 402 be updated from time to time. Here, terminal 402 may be configured and/or programmed to have a "duty cycle" indicating times that terminal 402 may be in communication with center 410 in a call over a bi-directional wireless communication link, for example. With knowledge of such a duty cycle, at event 420 center 410 may transmit at an appropriate time a PRM to terminal 402 including, for example, information specifying a particular position estimation mode to be used (e.g., assisted or unassisted) based, at least in part, on a particular application, QoS, reporting criteria and/or the like. Here, such reporting criteria may include, for example, a format and/or frequency for providing location information regarding terminal 402. Accordingly, following an initial cycle of providing such information at events 422 through 428, terminal 402 may provide updates of such information from time to time as shown by events 430 through 436, for example.

As illustrated above using particular examples, a terminal 102 may communicate with a center 110 over a bi-directional communication link including a wireless communication link. In an uplink portion, for example, terminal 102 may transmit information such as, for example, status information and/or information relating to a location of terminal 102. Such information may then be forwarded to an application server 114, for example. In a downlink portion of the bi-directional communication link, center 110 may transmit information such as, for example, configuration commands to terminal 102. As illustrated above, however, terminal 102 may comprise a low duty cycle device which, from time to time, may be in a hibernating state to, for example, conserve power. In particular implementations, accordingly, terminal 102 may need to transition to an awakened state to be able to receive information transmitted from a center 110 in a downlink portion of a bi-directional wireless communication link.

As illustrated above, terminal 102 may be adapted to intermittently awaken from a hibernated state as, for example, a low duty cycle device. In particular implementations such as in a CDMA network for example, while in an awakened state such a terminal 102 may perform slotted mode operations such as listening to a paging channel, receiving messages and sending messages. As such, while in an awakened state terminal 102 may transmit information to a center 110 on an uplink portion of a wireless communication link and/or receive information from a center 110 on an associated downlink portion. In one particular implementation, although claimed subject matter is not limited in this respect, such a terminal 102 may be adapted and/or configured to awaken from such a hibernated state in synchronization with an associated center 110. As such, the associated center 110 may transmit information to terminal 102 while terminal 102 is awakened from a hibernated state and capable of receiving information on a downlink portion of a wireless communication link.

In one implementation, a terminal 102 may register with a wireless communication network by, for example, acquiring a signal from a nearby MSC/BSS 104, and exchanging information using techniques similar to those used for registering devices joining a CDMA network, for example. As part of such a registration, terminal 102 may indicate attributes such as, for example, identification information, information indicating particular capabilities of terminal 102 such as battery capacity and remaining battery life, information specifying a hibernation duty cycle (e.g., time between consecutive wake ups $T_{HI}$ and/or the duration of being in an awakened state in any one cycle). In one particular example, such information specifying battery capacity and/or remaining battery life may enable an application server 114 to compute an appropriate hibernation interval for the terminal 102 (e.g., longer hibernation intervals if the battery is weak or has low capacity) and/or configure terminal 102 according to appropriate times between wake-up events and duration intervals for terminal 102 to be in an awakened state. Such information may also be used for triggering messages to a remote user (e.g., via SMS messages) notifying the remote user that the battery is getting low and needs to be replaced or recharged.

In one implementation, following registration, terminal 102 may be placed in an idle but awakened state for a defined duration to receive messages from a downlink portion of a communication link. During this duration, for example, a center 110 may forward any pending messages addressed to the registered terminal 102 and received at center 110 (e.g., from an application server 114) prior to registration.

In another implementation, in response registration of the terminal 102 with the network, a center 110 may transmit a configuration message to the registered terminal 102. Such a configuration message may include information such as, for example, $T_{BEGIN}$ (time at which terminal 102 is permitted to begin unsolicited messaging) and/or $T_{END}$ (time after which terminal 102 is not permitted to send any more messages). Accordingly, with knowledge of $T_{HI}$, $T_{BEGIN}$ and $T_{END}$, periods of terminal 102 in an awakened state may be synchronized with a center 110 to receive downlink messages as pointed out above. During such a period when terminal 102 is in an awakened state, for example, the center 110 may forward in a downlink portion of a wireless communication link messages including pending messages and/or commands addressed to the terminal 102 (e.g., from an application server 114).

In yet another implementation, a terminal 102 may transmit an unscheduled and unsolicited message to a center 110 to indicate that the terminal is in an awakened state for a duration during which the terminal 102 may receive downlink messages. In response to such an unsolicited message, the center 110 may locate and obtain pending messages that are addressed to the terminal 102 and forward these messages in a downlink portion of a wireless communication link as illustrated above.

In one example, a terminal 102 may lose synchronization with a center 110. In one particular implementation, a terminal 102 may be adapted to transmit a "keep alive" message to the center at intervals. Here, such a keep alive message may include information such as, for example, information provided in a registration message, for example.

In particular implementations, a center 110 may schedule messages for transmission to a terminal 102. For example, a center 110 may store messages addressed to a terminal in a data structure that permits transmission through an associated MSC/BSS 104 during periods in which a recipient terminal 102 is in an awakened state and capable of receiving messages from a downlink portion of a wireless communication link. A center 110 may schedule downlink messages to be forwarded by a particular MSC/BSS 104 on regular scheduling intervals. For example, a center 110 may select a particular scheduling interval for transmission of a downlink message through an MSC/BSS 104 to a terminal 102 to synchronize transmission of the downlink message during a subsequent period in which the terminal 102 is in an awakened state. Accordingly, the recipient terminal 102 may be adapted to intermittently awaken from a hibernating state in synchronization with a center 110 to receive downlink messages.

In one particular implementation, a center 110 may schedule such downlink messages in a particular scheduling interval based, at least in part, on an average delay $T_{MIN\_MSC\_DELAY}$ in transmission of a downlink message from the associated MSC/BSS 104 following receipt of such a messages from the center 110. Here, the center 110 may forward messages to an associated MSC/BSS 104 at $T_{MIN\_MSC\_DELAY}$ prior to scheduled transmission to a terminal 102 by, for example, passing the messages to an appropriate application and/or transport layer (e.g., in protocol stack 210).

As illustrated elsewhere herein, a terminal 102 may be adapted to communicate with an associated MSC/BSS in a wireless communication link according to a CDMA protocol. In this particular implementation, following a boot sequence and registration as discussed above, a terminal 102 may be placed in a slotted mode where a wake up time may be determined as follows:

$$\text{WAKEUP\_TIME} = \left[ T_{HI} * \left\lfloor \frac{\text{CDMA\_SYSTEM\_TIME}}{T_{HI}} \right\rfloor + (T_{OFFSET}) \right]$$

WAKEUP_TIME = $T_{HI}$ * (CDMA_SYSTEM_TIME / $T_{HI}$) + $T_{OFFSET}$ if WAKEUP_TIME ≥ CDMA_SYSTEM_TIME; and

WAKEUP_TIME =

$T_{HI}$ * (CDMA_SYSTEM_TIME / $T_{HI}$) + $T_{OFFSET}$ + $T_{HI}$ if WAKEUP_TIME < CDMA_SYSTEM_TIME.

Where TOFFSET may be determined using a hash as follows:

$$T_{OFFSET} = \left\lfloor \frac{N * [[2654435769 * ESN] \text{MOD} 2^{32}]}{2^{32}} \right\rfloor$$

N is an integer value expression of $T_{HI}$ in seconds; and
ESN is 32-bit expression.

Figure 6:
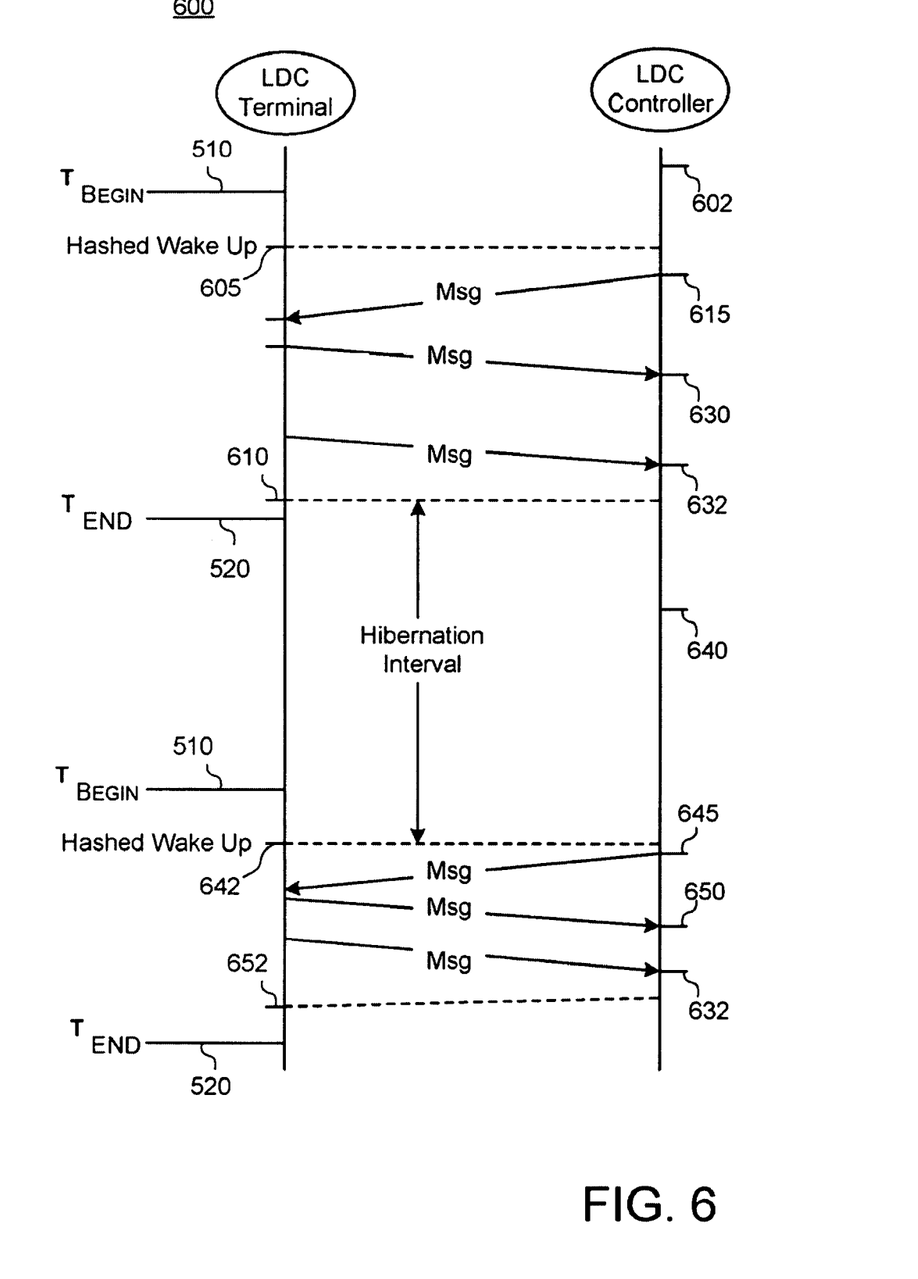
FIG. 6 is diagram illustrating synchronization of scheduling of an awakening of device from a hibernating state for messages transmitted in a wireless communication link according to a particular implementation.

Synchronous scheduling 600 as used in one implementation is illustrated in FIG. 6. Shown are timelines illustrating for a center 110 and a terminal 102. It will be appreciated that FIG. 6 depicts timelines for a single center 110 and a single terminal 102, and that particular implementations may provide for at least one center 110 and a plurality of terminals 102. A wake up time 605 for the terminal 102 based, at least in part, on $T_{BEGIN}$ 510 has been hashed and is known to both center 110 and terminal 102. The center 110 may have received messages (e.g., from an AS 114) for transmission to the terminal 102, which have been stored and sorted in a memory (not shown) according to a destination associated with terminal 102 and time of future transmission. At substantially wake up time 605 the center 110 may initiate transmission of a message at time 615 including any stored messages for transmission to the terminal 102. Such a message is received at time 620 by the terminal 102. A responsive message may be received by the center 110 from the terminal 102. Before transition to hibernation at time 610 is reached, the terminal 102 may transmit one or more messages to center 110 received at time 632. In the particular illustration of FIG. 6, receipt of such messages by center 110 occurs at time 632 prior to transition to hibernation at time 610. It should be understood, however, that in other scenarios center 110 may actually receive such messages after such a transition of the terminal 102 to hibernation. Such a message may comprise, for example, a KA message including information regarding operational status, battery status, network information, and a request for configuration data. In one implementation, after $T_{END}$ occurs and the terminal 102 is regarded as being in a hibernating state, the center 110 at time 640 may select pending messages for transmission to the terminal 102 the next transmission time, coinciding with the subsequent period in which terminal 102 transitions to an awakened state. While FIG. 6 shows merely one time 640 during a hibernation interval at which the center 110 may select pending messages for transmission, it should be understood that the center may make such a selection at multiple times during such a hibernation interval. At substantially the next awakening at time 642, the center 110 may initiate transmission of pending messages to the terminal 102, after which the center 110 receives at time 650 a message from the terminal 102. At time 632, the center 110 may continue to receive messages such as KA messages depending upon an amount of time left before transition back to a hibernating state 652. In another implementation, transitions between a hibernating state and awakened state at times 610 and 652 may be dynamically adjusted according to the number and nature of the messages sent and received by center 110 for transmission to terminal 102. For example, if the number of pending messages is too large to be carried by a single SMS message transmitted at times 615 or 645, then only a portion will be transmitted at these times. Upon receiving messages at times 630 and 650, the center 110 may then reset and extend transitions to a hibernating state at times 610 and 652. A center 110 may then send (not shown) a subsequent portion and/or remainder of the pending messages in a similar manner. This process may be continued until all of the pending messages addressed to terminal 102 are transmitted by the center 110.

In one particular implementation, synchronization and/or timing between a center 110 and a terminal 102 may be substantially de-coupled from timing of transmission of uplink and downlink messages in a wireless communication link. Referring again to protocol stacks 202 and 210, illustrating communication between a center 110 and terminal 102 in one implementation, SMS messages may be transmitted between communication layers of respective center 110 and terminal 102 without regard to message timing on uplink and downlink messages. In one particular implementation, SMS messages may be transmitted be transmitted between a message center 106 and center 110 in data packets over Internet Protocol infrastructure. Thus, center 110 may schedule messages and/or periods when terminal 102 is hibernating or awake independently of the timing of messages transmitted in the uplink and downlink portions between terminal 102 and an MSC/BSS 104. Accordingly, a center 110 may be geographically decoupled and/or removed from a cellular network and placed elsewhere for more convenient access by a party who communicates with terminal 102.

In one implementation as discussed above, a center 110 may determine a length of a duration in which a terminal 102 is in an awakened state in any one cycle. The center 110 may set this duration by, for example, specifying such a duration in one or more configuration messages transmitted to the terminal 102. In another implementation, a center 110 may determine such a duration based, at least in part, on an uncertainty associated with the average delay $T_{MIN\_MSC\_DELAY}$ in transmission of a downlink message from an associated MSC/BSS 104 following receipt of such a messages from the center 110. Here, for example, if the uncertainty associated with $T_{MIN\_MSC\_DELAY}$ increases, the center 110 may increase the duration in which a terminal 102 is in an awakened state in any one cycle to ensure that the terminal 102 will be in an awakened state to received messages. Likewise, if the uncertainty associated with $T_{MIN\_MSC\_DELAY}$ decreases, the center 110 may decrease this duration. Here, it should be understood that decreasing the duration in which a terminal 102 is in an awakened state may be advantageous to increasing longevity of a batter powering operation of the terminal 102.

In one implementation, although claimed subject matter is not limited in this respect, the average delay $T_{MIN\_MSC\_DELAY}$ in transmission of a downlink message may be determined based, at least in part, upon round-trip message times (e.g., difference between time 615 and 630, or between 645 and 650 as shown in FIG. 6). Similarly, an uncertainty in the actual delay of this transmission may be determined from a variance about the average delay $T_{MIN\_MSC\_DELAY}$.

Figure 5:
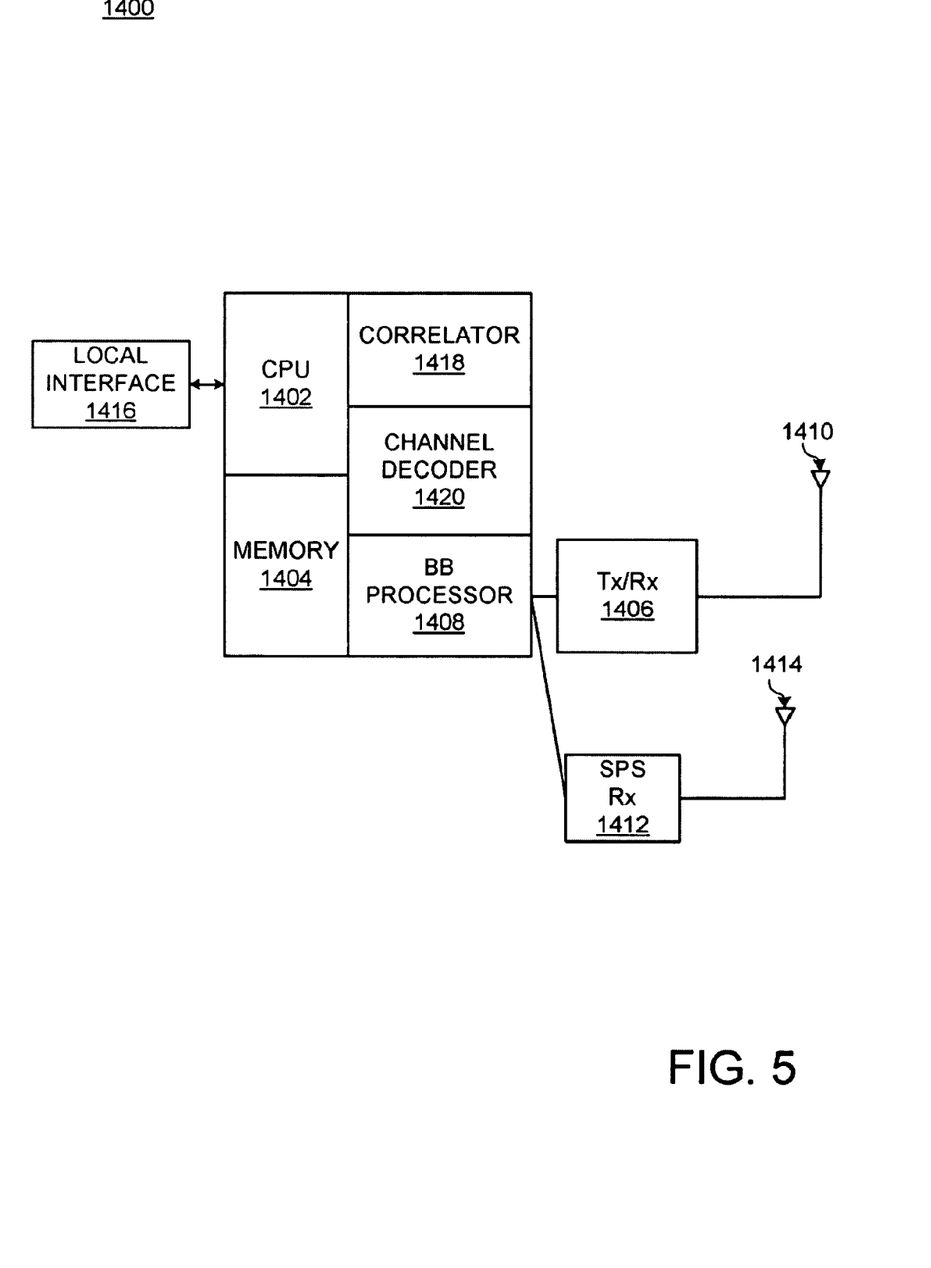
FIG. 5 is a schematic diagram of a device capable of communication with a wireless network according to one implementation.

In a particular implementation, a terminal 102 may comprise a device as shown in FIG. 5, which is capable of processing SPS signals received at an antenna 1414 for determining pseudorange measurements and communicating with a wireless communication network through antenna 1410. Here, a radio transceiver 1406 may be adapted to modulate an RF carrier signal with baseband information, such as data, voice and/or SMS messages, onto an RF carrier, and demodulate a modulated RF carrier to obtain such baseband information. Antenna 1410 may be adapted to transmit a modulated RF carrier over a wireless communications link and receive a modulated RF carrier over a wireless communications link.

Baseband processor 1408 may be adapted to provide baseband information from CPU 1402 to transceiver 1405 for transmission over a wireless communications link. Here, CPU 1402 may obtain such baseband information from a local interface 1416 which may include, for example, environmental sensory data, motion sensor data, altitude data, acceleration information (e.g., from an accelerometer), proximity to other networks (e.g., ZigBee, Bluetooth, WiFi, peer-to-peer). Such baseband information may also include location information such as, for example, an estimate of a location of device 1400 and/or information that may be used in computing same such as, for example, pseudorange measurements.

SPS receiver (SPS Rx) 1412 may be adapted to receive and demodulate transmissions from SVs, and provide demodulated information to correlator 1418. Correlator 1418 may be adapted to derive correlation functions from the information provided by receiver 1412. Correlator 1418 may also be adapted to derived pilot-related correlation functions from information relating to pilot signals provided by transceiver 1406. This information may be used by device acquire a wireless communications network.

Channel decoder 1420 may be adapted to decode channel symbols received from baseband processor 1408 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1420 may comprise a turbo decoder.

Memory 1404 may be adapted to store machine-readable instructions which are executable to perform one or more of processes, examples, implementations, or examples thereof which have been described or suggested. CPU 1402 may be adapted to access and execute such machine-readable instructions. However, these are merely examples of tasks that may be performed by a CPU in a particular aspect and claimed subject matter in not limited in these respects.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof. One or more claims may recite a feature in the form "A or B, or both" to specify that such a feature may include element/limitation "A" or element/limitation "B", or both element/limitation "A" and element/limitation "B". Furthermore, such a feature recited in the form "A or B, or both" is not to exclude the presence of elements in addition to element/limitation "A" or element/limitation "B".

What is claimed is:

1. An apparatus comprising:
   means for processing signals received at a receiver; and
   means for intermittently awakening a device at a wake up time from a hibernating state in synchronization with said apparatus to exchange information with said apparatus over a wireless communication network, said information including location information which is based, at least in part, on said processed signals,
   wherein the hibernating state is based on a hibernation duty cycle that indicates a time interval at which said device is to awaken from the hibernating state, wherein said time interval is defined based, at least in part, on an uncertainty associated with a delay between initiating transmission of said information and receipt at said device from a downlink, and
   wherein the wake up time is determined based at least in part on a hash function of the hibernation duty cycle.

2. The apparatus of claim 1, wherein said means for intermittently awakening said device further comprises means for intermittently awakening said device from said hibernating state according to a predetermined schedule.

3. The apparatus of claim 1, and further comprising means for initiating exchange of said information with said apparatus using a short message service (SMS).

4. The apparatus of claim 1, wherein said location information comprises pseudorange measurements determined based, at least in part, on said received signals.

5. A method comprising:
   receiving messages addressed to a device at a server; and
   scheduling transmission of said messages to said device through a downlink portion of a wireless communication link during intervals in which said device is awakened at a wake up time from a hibernating state, wherein said intervals are defined based, at least in part, on an uncertainty associated with a delay between transmission of said messages and receipt at said device from said downlink,
   wherein the hibernating state is based on a hibernation duty cycle that indicates a time interval at which said device is to awaken from the hibernating state, in synchronization with said server to exchange information with said server over said wireless communication link, and
   wherein the wake up time is determined based at least in part on a hash function of the hibernation duty cycle.

6. The method of claim 5, and further comprising:
   receiving information from said device indicating a hibernation duty cycle; and
   scheduling said transmission based, at least in part, on said information.

7. The method of claim 6, wherein said information is transmitted from said device during a procedure to register said device with a wireless communication network.

8. The method of claim 5, wherein said messages are transmitted according to a short message service (SMS) protocol.

9. The method of claim 5, wherein said scheduling said transmission of messages comprises scheduling said messages independently of the timing of transmission of messages in said downlink portion.

10. The method of claim 5, and further comprising:
    defining an interval for periods in which said device in an awakened state; and
    scheduling transmission of a message to indicate such defined interval.

11. The method of claim 10, wherein said defining said interval comprises changing said interval based, at least in part, on a battery level associated with the device.

12. An article comprising:
    a storage medium having machine-readable instructions stored thereon which, if executed by a computing platform, are adapted to cause said computing platform to
    store messages addressed to a device in a data structure of a server; and
    schedule transmission of said messages to said device through a downlink portion of a wireless communication link during intervals in which said device is awakened at a wake up time from a hibernating state, wherein said instructions, if executed, are further adapted to cause said computing platform to define said interval based, at least in part, on an uncertainty associated with a delay between transmission of said messages and receipt at said device from said downlink,
    wherein the hibernating state is based on a hibernation duty cycle that indicates a time interval at which said device is to awaken from the hibernating state, in synchronization with said server to exchange information with said server over said wireless communication link, and
    wherein the wake up time is determined based at least in part on a hash function of the hibernation duty cycle.

13. The article of claim 12, wherein said machine-readable instructions, if executed, are further adapted to cause said computing platform to:
    schedule said transmission based, at least in part, on information received from said device indicating a hibernation duty cycle.

14. The article of claim 12, wherein said instructions, if executed, are further adapted to cause said computing platform to schedule said messages independently of the timing of transmission of messages in said downlink portion.

15. The article of claim 14, wherein said instructions, if executed, are further adapted to cause said computing platform to change said interval based, at least in part, on a battery level associated with the device.

16. The article of claim 12, wherein said instructions, if executed, are further adapted to cause said computing platform to:
 define an interval for periods in which said device in an awakened state; and
 schedule transmission of a message to indicate such defined interval.

17. An apparatus comprising:
 a computing platform, said computing platform being adapted to:
 store messages addressed to a device in a data structure of said apparatus; and
 schedule transmission of said messages to said device through a downlink portion of a wireless communication link during intervals in which said device is awakened at a wake up time from a hibernating state, wherein said intervals are defined based, at least in part, on an uncertainty associated with a delay between initiating transmission of said messages and receipt at said device from said downlink,
 wherein the hibernating state is based on a hibernation duty cycle that indicates a time interval at which said device is to awaken from the hibernating state, in synchronization with said apparatus to exchange information with said apparatus over said wireless communication link, and
 wherein the wake up time is determined based at least in part on a hash function of the hibernation duty cycle.

18. The apparatus of claim 17, wherein said computing platform is further adapted to:
 schedule said transmission based, at least in part, on said information indicating the hibernation duty cycle.

19. The apparatus of claim 17, wherein said computing platform is further adapted to:
 schedule transmission of said messages independently of the timing of transmission of said messages in said downlink portion.

20. The apparatus of claim 17, and further comprising:
 define an interval for periods in which said device in an awakened state; and
 schedule transmission of a message to indicate such defined interval.

21. The apparatus of claim 20, wherein said define said interval comprises change said interval based, at least in part, on a battery level associated with the device.

22. An apparatus comprising:
 means for receiving messages addressed to a device at said apparatus; and
 means for scheduling transmission of said messages to said device through a downlink portion of a wireless communication link during intervals in which said device is awakened at a wake up time from a hibernating state, wherein said intervals are defined based, at least in part, on an uncertainty associated with a delay between initiating transmission of said messages and receipt at said device from said downlink,
 wherein the hibernating state is based on a hibernation duty cycle that indicates a time interval at which said device is to awaken from the hibernating state, in synchronization with said apparatus to exchange information with said apparatus over said wireless communication link, and
 wherein the wake up time is determined based at least in part on a hash function of the hibernation duty cycle.

23. The apparatus of claim 22, and further comprising:
 means for receiving information from said device indicating a hibernation duty cycle; and
 means for scheduling said transmission based, at least in part, on said information.

24. The apparatus of claim 22, wherein said means for scheduling said transmission of messages comprises means for scheduling said messages independently of the timing of transmission of messages.

25. The apparatus of claim 22, and further comprising:
 means for defining an interval for periods in which said device in an awakened state; and
 means for scheduling transmission of a message to indicate such defined interval.

26. The apparatus of claim 25, wherein said means for defining said interval comprises means for changing said interval based, at least in part, on a battery level associated with the device.

* * * * *